US009712569B2

(12) United States Patent
Vashishtha et al.

(10) Patent No.: US 9,712,569 B2
(45) Date of Patent: Jul. 18, 2017

(54) METHOD AND APPARATUS FOR TIMELINE-SYNCHRONIZED NOTE TAKING DURING A WEB CONFERENCE

(71) Applicant: Adobe Systems Incorporated, San Jose, CA (US)

(72) Inventors: Samartha Vashishtha, Ambala Cantt (IN); Vikrant Rai, Solan (IN); Gaurav Gupta, Rohini (IN); Aman Kumar Gupta, Delhi (IN); Gaurav Satija, Gurgaon (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 209 days.

(21) Appl. No.: 14/311,668

(22) Filed: Jun. 23, 2014

(65) Prior Publication Data

US 2015/0373063 A1    Dec. 24, 2015

(51) Int. Cl.
*G06F 3/00*       (2006.01)
*H04L 29/06*    (2006.01)
*H04N 7/15*     (2006.01)

(52) U.S. Cl.
CPC ........ *H04L 65/1089* (2013.01); *H04L 65/403* (2013.01); *H04L 65/4015* (2013.01); *H04N 7/155* (2013.01)

(58) Field of Classification Search
CPC ............ H04L 65/1089; H04L 65/4015; H04L 65/403; H04N 7/15
See application file for complete search history.

(56) References Cited

U.S. PATENT DOCUMENTS

| 6,636,238 | B1 * | 10/2003 | Amir .................. | G06F 17/3074 |
| | | | | 707/E17.101 |
| 8,456,507 | B1 * | 6/2013 | Mallappa .............. | H04N 7/152 |
| | | | | 348/14.08 |
| 2011/0154192 | A1 * | 6/2011 | Yang ................... | G06F 17/2288 |
| | | | | 715/256 |
| 2012/0166952 | A1 * | 6/2012 | Alexandrov ......... | G06Q 10/101 |
| | | | | 715/730 |
| 2013/0091469 | A1 * | 4/2013 | Roberts ................. | G06Q 10/10 |
| | | | | 715/835 |

* cited by examiner

*Primary Examiner* — Thanh Vu
(74) *Attorney, Agent, or Firm* — Keller Jolley Preece (57) ABSTRACT

A computer implemented method and apparatus for timeline-synchronized note taking during a web conference. The method comprises receiving a note from a user in a web conference; generating metadata that identifies a timestamp in the web conference when the note was created and a user identifier of the user who authored the note; and storing the note and the metadata with a recording of the web conference.

20 Claims, 4 Drawing Sheets

METHOD AND APPARATUS FOR TIMELINE-SYNCHRONIZED NOTE TAKING DURING A WEB CONFERENCE

BACKGROUND OF THE INVENTION

Field of the Invention

Embodiments of the present invention generally relate to video conferencing and, more particularly, to techniques for timeline-synchronized note taking during a web conference.

Description of the Related Art

With the rapid growth of the Internet and ubiquitous broadband access, people are moving to online meetings, presentations and collaboration using various web based tools such as ADOBE CONNECT® available from Adobe Systems Incorporated. A web conference allows conferencing events, such as web meetings, eLearning and webinars to be shared with remote locations. When participating in a web conference, a user often takes personal notes to annotate a presentation. Currently, notes entered into a web conference user interface are public, meaning the notes are visible to all users. In order to take notes for personal user, the user either hand writes the notes on paper or takes notes using an external note-taking application, for example, NOTEPAD or EVERNOTE. It is useful to be able to refer back to a recording of a web conference to view portions of the web conference related to the user's personal notes. Currently, a user must manually advance and reverse through the recording to find a location where a personal note was taken. This is extremely inefficient and time-consuming for the user. Therefore, there is a need for a method and apparatus for timeline-synchronized note taking during a web conference.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for timeline-synchronized note taking during a web conference is described. The method receives a note from a user in a web conference. The method generates metadata that identifies a timestamp in the web conference when the note was created and a user identifier of the user who authored the note. The method then stores the note and the metadata with a recording of the web conference.

In another embodiment, an apparatus for timeline-synchronized note taking during a web conference is described. The apparatus includes a note taking module that receives a note from a user in a web conference. The note taking module generates metadata that identifies a timestamp in the web conference when the note was created and a user identifier of the user who authored the note. The note taking module then stores the note and the metadata with a recording of the web conference.

In yet another embodiment, a computer readable medium for timeline-synchronized note taking during a web conference is described. The computer readable medium stores computer instructions that, when executed by at least one processor causes the at least one processor perform the method for timeline-synchronized note taking during a web conference.

While the method and apparatus is described herein by way of example for several embodiments and illustrative drawings, those skilled in the art will recognize that the method and apparatus for timeline-synchronized note taking during a web conference is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for timeline-synchronized note taking during a web conference defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for timeline-synchronized note taking during a web conference. The embodiments enable a user to take notes in a web conference user interface as the web conference progresses. The note is stored with a timestamp that identifies the time during the web conference when the note was entered. The note is also stored with a user identifier that identifies the user who authored the note. The user can specify whether the note is a public note or a private note. During playback of a recording of the video conference, the notes that were taken are displayed along a timeline with the recording. A private note is only shown to the user who authored the note, while public notes are visible to all users viewing the recording. In addition to user entered notes, activities of the user are stored. Activities include, but are not limited to, the user joining the web conference, asking a question, responding to a poll, leaving the web conference, and the like. Activities are private, meaning activities are treated as private notes are only shown to the user who performed the activity.

As previously explained, existing solutions allow for public note-taking. However, private notes must be entered using an external note-taking application. These private notes are difficult to reconcile with the web conference. A user must scan the playback of the web conference to identify a time during the web conference when the notes were taken. These disconnected applications create an inefficient user experience.

Thus, and in accordance with an embodiment of the present invention, techniques are provided herein that allow for timeline-synchronized note taking during a web conference. Embodiments of the invention enable a user in a web conference to enter private notes in a user interface of the web conference. The notes are stored on a web conferencing server along with a recording of the web conference. In addition to user entered notes, activities of the user during the web conference are recorded for the user. When the recording is played back, the private notes are shown only to the user who authored the note. In addition, the recorded activities are also shown only to the user to whom the activities apply. The term "private notes", as used herein refers to private notes entered by the user as well as the recorded activities of the user. The author may share the private note, edit the private note, merge the private note with a note of another user, convert the private note to a public note, or print the note.

When a web conference is initiated, users join the web conference. As each user joins the conference, a user identifier, a timestamp of when the user joined the web conference, and the activity of joining the conference is recorded. As the web conference progresses, a user can enter notes. Notes may be typed, entered using a stylus, or be an audio recorded note. In some embodiments, an area of the user interface is provided for entering public notes and a separate area of the user interface is provided for entering private notes. In other embodiments, an area of the user interface is provided for entering all notes and the user is provided for example, radio buttons, a pull-down menu, or any means to specify whether the entered note is public or private. The user may select a font in which to enter the note. The user specifies that the note is complete by, for example, selecting a "DONE" button, or clicking outside of the note in the web conference user interface. If the note is private, a user identifier, a timestamp, and the content of the note are sent to a web conference server to be stored with a recording of the web conference. However, if the note is public, only the timestamp and content of the note are sent to the web conference server and stored with the recording of the web conference. As the user performs activities, such as responding to a poll, asking questions, leaving the web conference, and the like, the user identifier, timestamp, and activity are sent to the server and stored with the web conference. Permissions are stored for each note to indicate whether the note is public or private.

When a user plays the recording of the web conference, a timeline of the web conference is displayed with the recording. The timeline is bookmarked, where a bookmark indicates that a note or activity exists for the time where the bookmark is located. When a user clicks on a bookmark, the note or activity is displayed and the recording is advanced (or reversed) to the time when the note or activity was entered. Public notes are displayed for all users who play the recording. However, private notes are displayed only to the user whose user identifier is stored in the private notes. The user may edit notes for which the user is an author. In addition, the user may print the notes. Further, the user may share one or more notes of the user or merge a note with a note of a different user.

In order to share notes, the user selects one or more notes to be shared and identifies a user with whom the notes are to be shared. The user may be selected from a list of users who participated in the web conference, or by entering user information that uniquely identifies the user. For example, a userID, user name, email address, or the like that uniquely identifies the user may be entered to identify the user. A role of either author or viewer is indicated for the selected user. The role of "author" allows the user to edit the shared note. The role of "viewer" merely allows the user to view the shared note, but not edit the note. The user identifier and the role of the user are stored with the note. In addition, the permissions of the note are modified to "shared".

In order to merge a note of a first user with a note of a second user, the first user selects the notes to merge. The first user must have access to the note. In other words, the second user must have already shared the note with the first user in order for the first user to view the note. Merging two notes includes identifying an earlier timestamp of the two notes. The earlier timestamp is used as the timestamp for the merged note. The content of the two notes are combined to create the content of the merged note. The first user and the second user are both given the role of author for the note. Permission for the note is set to "shared". The merged note along with a timestamp indicating when the note was created, authors, permissions, and content are stored with the merged note.

In order to print the notes, the user may specify whether to print private notes, public notes, or all notes. The specified notes are merged into a single document, which the user may then edit or format to meet the needs of the user. The final set of notes may then be printed.

In some embodiments, a companion note-taking application is provided. The companion application is executed on a device, such as a smartphone or tablet, remote from the device where the web conference is being viewed. The companion note-taking application enables a user to select a web conference for which the user would like to take notes. The user may enter notes in the companion note-taking application. When the user enters a note, the timestamp when the user typed the note, a user identifier, and note content are sent from the remote device to the server and stored exactly as if entered into the user interface of the web conference as described above.

Advantageously, the present invention can be integrated into online learning products such as ADOBE CONNTECT, ADOBE PRESENTER, ADOBE CAPTIVATE, eLearning Suite, or any learning management system. During playback of a recording of the web conference, a user may quickly move to a specific moment in the web conference by selecting a note or a bookmark of a note where the note was entered. In addition, notes can be shared or merged with the notes of other users thereby enhancing collaboration in a shared learning environment.

Various embodiments of a method and apparatus for timeline-synchronized note taking during a web conference are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
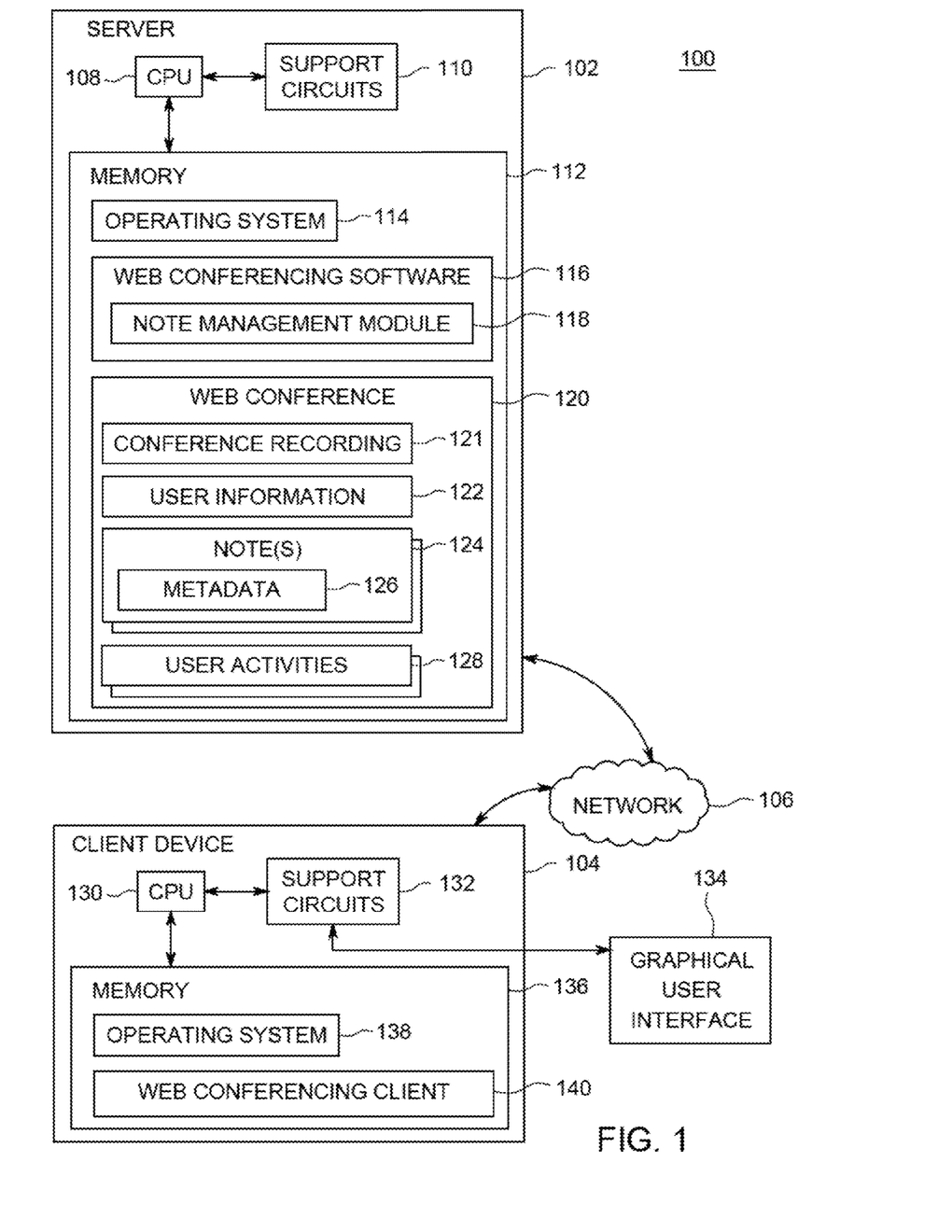
FIG. 1 is a block diagram of a system for timeline-synchronized note taking during a web conference, according to one or more embodiments.

FIG. 1 is a block diagram of a system 100 for timeline-synchronized note taking in a web conference, according to one or more embodiments. The system 100 includes a server 102 and a client device 104, communicatively coupled to one another via a network 106. The server 102 is any computing device, such as a desktop computer, laptop, tablet computer, smart phone, personal digital assistant (PDA), cellular phone, and the like that can act as a web conferencing server. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, web conferencing software 116, and a web conference 120. The web conferencing software 116 includes a note management module 118. The web conference 120 includes user information 122, notes 124, and user activities 128. Each note 124 includes metadata 126. In some embodiments, user activities 128 are stored as notes 124. In some embodiments, user activities 128 are stored in a separate file for each user. The operating system 114 may include various commercially known operating systems.

The client 104 is a computing device, such as a desktop computer, laptop, tablet computer, smart phone, personal digital assistant (PDA), cellular phone, and the like, and includes a web conferencing client 140, e.g., software executing on the active participant device 104 to facilitate web-based conferencing on the graphical user interface 134. The client 104 includes a Central Processing Unit (CPU) 130, support circuits 132, and a memory 136. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 includes at least one of Read Only Memory (ROM), Random Access Memory (RAM), disk drive storage, optical storage, removable storage and/or the like.

The memory 106 includes an operating system, and the web conferencing client 140. The operating system 138 may include various commercially known operating systems.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

When a web conference 120 is initiated, a user joins the web conference 120 using the web conferencing client 140. In some embodiments, a conference identifier, a timestamp and a user identifier are recorded when the user joins the web conference 120. The conference identifier, timestamp, user identifier, and an indicator that the user joined the conference, are sent to the server 102. The server generates metadata that include the information. For example, the metadata may be in the form <conferenceID><timestamp><userID><"user joins meeting">. In some embodiments, the note management module 118 stores the metadata as user activities 128. User activities 128 are activities that are associated with a specific user. In some embodiments, the note management 118 stores the metadata 126 as a note 124. When stored as the note 124, said user activities are identified as "private".

Throughout the web conference 120, user activities, such as answering a poll, asking a question, leaving the web conference, and the like are sent to the server 102 and stored as either notes 124 or separately as user activities 128.

In addition to activities, a user may enter annotations or notes via the graphical user interface 134. Notes may be typed, entered using a stylus, or an audio note. In some embodiments, the graphical user interface 134 includes an area for entering private notes that is separate from an area for entering public notes. In some embodiments, the graphical user interface 134 includes one area for entering notes. In such embodiment, the user indicates whether the note is public or private. When the user enters the note, the web conferencing client 140 identifies a timestamp of when the user started entering the note. The timestamp of when the user started entering the note is used because it is likely that the note relates to what is happening in the web conference at the moment the user starts entering the note. When the user finishes entering the note, the web conferencing client 140 sends a conference identifier, the timestamp, a user identifier that identifies the author of the note, an indication of whether the note is public or private, and the content of the note to the server 102.

If the user joins the web conference 120 as a guest, meaning the user does not have a user identifier included in user information 122 on the server 102, then the user may only enter public notes. Public notes are sent to the server 102 with the conference identifier, the timestamp, and the content of the note. No user identifier is included. The note management module 118 generates metadata 126 for the note. The metadata 126 formats the information received from the web conferencing client 140. The metadata 126 for a note 124 identifies the user as an author of the note 124. The note management module 118 retrieves user information 122 associated with the user identifier received from the web conferencing client 140. For example, the note management module 118 may retrieve an email address and a display name of the user and store the user identifier, email, and display name in the metadata 126. In addition, the note management module 118 stores the timestamp as the creation date of the note. The note management module 118 also stores the content of the note, and sets the permissions of the note 124 to either private or public, as specified by the user. If the information from the web conferencing client 140 does not include the user identifier, only the timestamp and content of the note 124 are stored and the permissions of the note are set to "public".

The note management module 118 continually stores the received notes 124 for the duration of the web conference 120. When the web conference 120 ends, the web conferencing software 116 stores a recording of the web conference 120 as conference recording 121.

When a user requests to view the conference recording 121, the note management module 118 identifies a user identifier associated with the user who requests to view the conference recording 121. If the user has not provided a user identifier, the note management module 118 extracts all notes 124 that have permissions set to "public". The note management module 118 further extracts timestamps from the metadata 126 of the notes 124. The web conferencing software 120 provides the conference recording 121 to the web conferencing client 140. The conference recording 121 is played with a timeline. On the timeline, bookmarks are displayed to visually represent each note 124. In addition, the notes 124 are displayed, for example, below the timeline. As the conference recording 121 is played, the notes 124 that were entered during the web conference 124 are displayed. When a user selects a bookmark from the timeline, the note 124 associated with the bookmark is displayed and the conference recording 121 is advanced (or reversed) to the location in the recording associated with the timestamp of the bookmark.

If the user who requests to view the conference recording 121, identifies a user identifier, for example, by signing into the server 102, the note management module 118 extracts all notes 124 that have permissions set to "public" in the metadata 126. In addition, the note management module 118 extracts all notes 124 that have the user identifier listed in the metadata 118. The user identifier signifies that the user is an author of the note, or that another user has shared the note with the user in order to allow the user to view the note 124. In some embodiments, where user activities 128 are stored separate from notes 124, the user activities 128 associated with the user identifier are also extracted.

The note management module 118 extracts timestamps from the metadata 126 of the notes 124 and user activities 128, as well as from the user activities 128 if so embodied. The web conferencing software 120 provides the conference recording 121 to the web conferencing client 140. On the timeline, bookmarks are displayed to visually represent each note 124 and user activity 128. In addition, the content of the notes 124 are displayed. In some embodiments, public notes are distinguished from private notes via color coding, although any indicator may be used to distinguish different types of notes. In some embodiments, user activities 128 are also distinguished from public notes and private notes. However, in some embodiments, user activities 128 are displayed as private notes. As described previously, the user may select a bookmark from the timeline. The note 124 associated with the bookmark is displayed and the conference recording 121 is advanced (or reversed) to the location in the conference recording 121 associated with the timestamp of the bookmark.

The user may select a displayed note in order to edit the note 124. If the user is an author of the note 124, the user may edit the content of the note 124. However, if the metadata 126 for the note 124 does not identify the user as an author, the user may only view the note. If the user is identified as an author, the user edits the displayed note. A timestamp is recorded to identify when the displayed note was edited. The edited displayed note is sent to the server 102, where the note management module 118 updates the metadata 126 for the note 124 with the edit timestamp and the edited content.

The user may select one or more displayed notes in order to share the one or more displayed notes. The user selects one or more displayed notes on the graphical user interface 134 to be shared. In some embodiments, a user with whom the notes are to be shared is selected from a list of users who participated in the web conference 120. The web conferencing software 116 provides a list of users from user information 122, such that one or more may be selected for sharing. In another embodiment, user information that identifies the user may be entered via the graphical user interface 134, for example, a userID, user name, email address, or the like that uniquely identifies the user. The user specifies a role of the selected user. The user may be given the role of "author" which allows the user to edit the shared note. Otherwise, the user is given the role of "viewer" which merely allows the user to view the shared note, but not edit the note. The one or more user identifiers for the user and the selected role of each user are sent to the server 102. The note management module 118 stores the one or more user identifiers and the role of each of the one or more user with the note 124. In addition, the note management module 118 changes the permissions of the note 124 to "shared".

The user may select two or more displayed notes in order to merge the two or more displayed notes. The user (i.e., a first user) may merge a displayed note with a note of a second user. The second user must have already shared the note with the first user in order for the displayed note to be included on the timeline. The displayed notes are identified. For example, the user may select two notes and select "Merge" from a drop down menu. The two notes are sent to the server 102 to merge. The note management module 118 compares the timestamp of the note 124 of the first user and the timestamp of the note 124 of the second user. The note management module 118 creates a new merged note 124. The merged note 124 includes an earlier of the two timestamps as the timestamp for the merged note 124, includes the user information for the users, gives the role of "author" to each user, combines the content of the two notes 124 that are being merged and sets the permissions of the note 124 as "merged". The note management module 118 generates metadata 126 for the note 124 and stores the metadata 126 with the note 124. By creating a new merged note 124, the original notes 124 from which the merged note was created are preserved.

The user may opt to print the notes 124. The user may select to print just the user's private notes, just public notes, or all notes 124 for the web conference 120. The note management module 118 merges the specified notes into a single document. The note management module 118 provides the document to the web conference client 140. The web conferencing client 140 displays the document on the graphical user interface 134, where the user may then edit or format the document to meet the needs of the user. The final set of notes may then be stored locally or printed.

Figure 2:
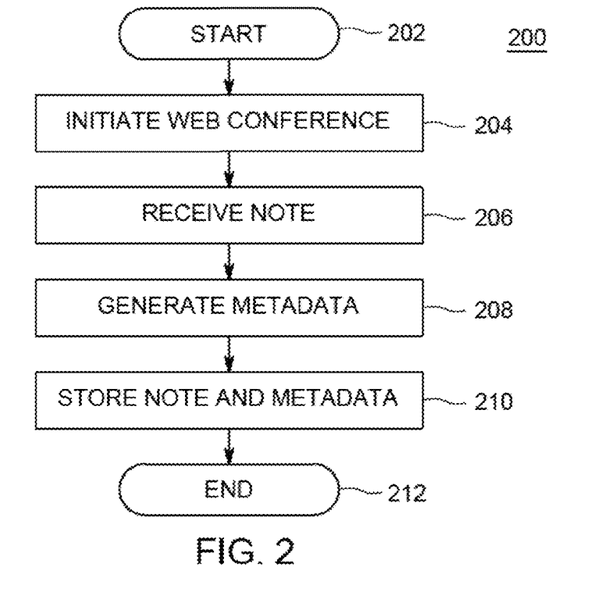
FIG. 2 depicts a flow diagram of a method for timeline-synchronized note taking during a web conference, as performed by the note management module of FIG. 1, according to one or more embodiments.

FIG. 2 depicts a flow diagram of a method 200 for timeline-synchronized note taking during a web conference, as performed by the note management module 118 of FIG. 1, according to one or more embodiments. The method 200 starts at step 202 and proceeds to step 204.

At step 204, the method 200 initiates a web conference. When the web conference is initiated, the method 200 begins recording the web conference. At the start of the web conference one or more users join the web conference, although users may join and the leave the web conference at any time. In addition, during the web conference, a user may perform different actions. For example, a user may ask a question, answer a poll, enter a note, and the like.

The method 200 proceeds to step 206, where the method 200 receives a note. When a user performs an activity or enters a note during the web conference, information regarding the activity or note is sent to the method 200 for processing. The note includes at least a conference identifier, a timestamp, a user identifier, and content. The note may also include an identification of whether the note is public or private, as well as style/formatting information.

The method 200 proceeds to step 208, where the method 200 generates metadata to store with the content of the note as described in detail with respect to FIG. 3 below.

The method 200 proceeds to step 210, where the method 200 stores the note and the metadata with a recording of the web conference. By storing the notes and metadata with a recording of the web conference, the notes can be displayed during playback of the recording, as described in further detail with respect to FIG. 4 below. The method 200 proceeds to step 212 and ends.

Figure 3:
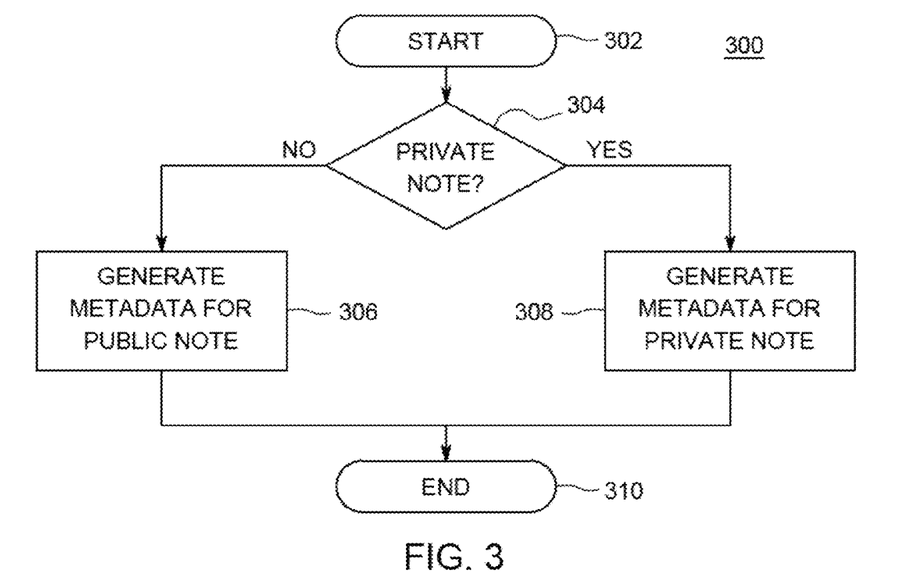
FIG. 3 depicts a flow diagram of a method for generating metadata for a note, as performed by the note management module of FIG. 1, according to one or more embodiments.

FIG. 3 depicts a flow diagram of a method 300 for generating metadata for a note, as performed by the note management module 118 of FIG. 1, according to one or more embodiments. The metadata may be stored using any file format. For example, the metadata may be stored using a format that includes but not limited to an XML file, in a database, flat file, or JSON. The method 300 starts at step 302 and proceeds to step 304.

At step 304, the method 300 determines whether the received note is public or private. The method 300 determines that the note is public if the note does not include a user identifier or the note does include a user identifier, and the user specified that the note as "public". The method 300 determines that the note is private if the received information regarding the note includes a user identifier, and the user specified the note to be "private". If the method 300 determines that the note is public, the method 300 proceeds to step 306.

At step 306, the method 300 records the time stamp, the content of the note, and sets the permissions to public. The generated metadata for the public note may be as follows:

```
<?xml version="1.0"?>
<Session_Notes>
    <session>
        <meeting id="0123456"/>
        <recordingid="123456"/>
        <others/>
    </session>
    <notes>
        <note>
            <meta>
                <time>
                    <created>2014-01-30T08:19:30-05:00</created>
                </time>
                <permissions>Public</permissions>
            </meta>
            <content>
                <MIMEType>text/plain</MIMEType>
                <body>This is a sample public note</body>
            </content>
            <style>
                <color>#DDDDDD</color>
                <fontstyle>
                    <font>Ariel</font>
                    <fontsize>12px</fontsize>
                </fontstyle>
                <others/>
            </style>
        </note>
    </notes>
</Session_Notes>
```

The meeting id identifies the meeting with which the note is associated. The time created identifies a date and time when the user created the note. Permissions identify whether the note is a public note or a private note and the body identifies the actual text that is the note. The style information identifies the font type and size used to create the note. The method 300 proceeds to step 310, where the method 300 ends.

However, if at step 304, the method 300 determines that the note is private, the method 300 proceeds to step 308.

At step 308, the method 300 records user information in the metadata. The method 300 accesses user information for the user. User information was stored on a web conferencing server when the user was identified as an invitee to the web conference. The method 300 retrieves information such as a user email address and a user display name for the web conference. The method 300 also identifies the user as an author of the note. The generated metadata for the private note may be as follows:

```
<?xml version="1.0"?>
<Session_Notes>
    <session>
        <meeting id="0123456"/>
        <recordingid="123456"/>
        <others/>
    </session>
    <notes>
        <note>
            <meta>
                <users>
                    <author>
                        <userid>sampleuser</userid>
                        <email>sample@adobe.com</email>
                        <displayname>SampleUser</displayname>
                    </author>
                </users>
                <time>
                    <created>2014-01-30T08:15:30-05:00</created>
                </time>
                <permissions>Private</permissions>
            </meta>
            <content>
                <MIMEType>text/plain</MIMEType>
                <body>This is a sample private note</body>
            </content>
            <style>
                <color>#DDDDDD</color>
                <fontstyle>
                    <font>Ariel</font>
                    <fontsize>18px</fontsize>
                </fontstyle>
                <others/>
```

```
        </style>
    </note>
  </notes>
</Session_Notes>
```

Due to the fact that this is a private note, the note includes an author. Identifying information of the author of the note is stored, as in the present example, a user ID, the author's email address, and a display name of the author. In some embodiments if the note is private and the note is a user activity rather than a user entered note, the method 300 enters the user activity in a file separate from the user entered notes. In such embodiment, the method 300 adds metadata regarding the user activity to the user activity file. The metadata may be as follows:

```
<userid="12345">
    <email>amkumarg@adobe.com</email>
    <Conferences>
        <Conferenceid="01245">
            <CuePoints>
                <CuePoint>
                    <Time>05:30</Time>
                    <Action>User Joins Conference</Action>
                </CuePoint>
                <CuePoint>
                    <Time>25:30</Time>
                    <Action>User Asks Question</Action>
                </CuePoint>
                <CuePoint>
                    <Time>25:30</Time>
                    <Action>User Answers Poll</Action>
                </CuePoint>
            </CuePoints>
        </Conference>
    </Conferences>
</user>
```

The metadata is for a specific user identified by the user ID and email address. The metadata identifies a time when an action took place during the web conference as well as the action. In such embodiment, each activity is added to a user activity file for the user. In the above example, the user performed the activities of joining the web conference, asking a question and answering a poll. The method 300 proceeds to step 310, where the method 300 ends.

Figure 4:
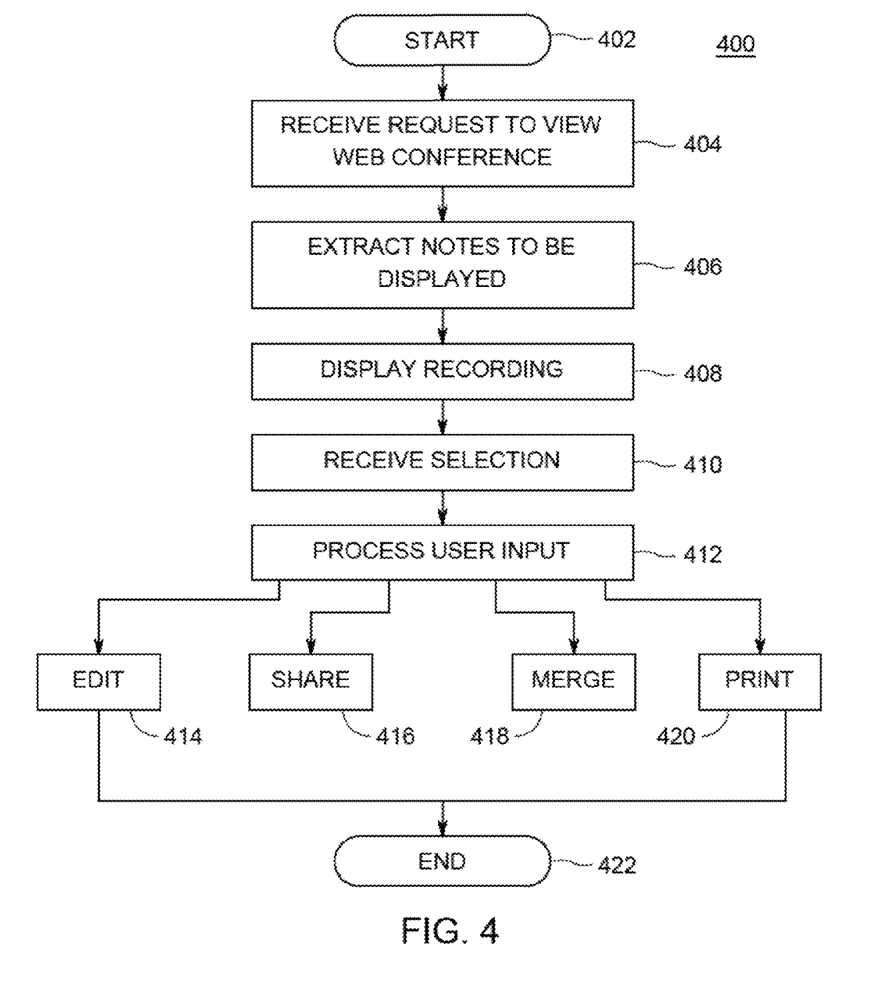
FIG. 4 depicts a flow diagram of a method for displaying notes during playback of a conference recording as performed by the note management module of FIG. 1, according to one or more embodiments.

FIG. 4 depicts a flow diagram of a method 400 for displaying notes during playback of a conference recording as performed by the note management module 118 of FIG. 1, according to one or more embodiments. The method 400 starts at step 402 and proceeds to step 404.

At step 404, the method 400 receives a request to view a recording of a web conference. If the user has an account, the user logs into a web conference server using the user identifier, which is included with the request. The method 400 proceeds to step 406. At step 406, the method 400 extracts notes associated with the web conference. The method 400 extracts all public notes for the web conference. The method 400 identifies public notes as notes with permissions set to "public". If a user identifier was included with the request, the method 400 extracts private notes associated with the user identifier from the notes. In some embodiments, where user activities are stored in a separate file, the method 400 also extracts the user activities from the file associated with the user id. The method 400 then identifies a timestamp for each note and user activity.

The method 400 proceeds to step 408, where the method 400 displays the recording of the web conference. The method 400 displays a timeline with the recording. The method 400 marks the timeline with bookmarks at a time on the timeline associated with each identified timestamp. During playback, the method 400 reads the metadata and parses various note elements. Based on the timestamp in each note, an actionable hyperlink is placed on the timeline. The notes are displayed below the timeline such that the notes are displayed in sync with when the note was entered during the web conference. In some embodiments, private notes are distinguished from public note using, for example, color coding.

The method 400 proceeds to step 410, where the method 400 receives a selection of a note on the timeline. The method 400 identifies a timestamp for the note. The method 400 advances (or reverses) playback of the recording of the web conference to the time where the note was entered. If the method 400 receives a selection of a bookmark rather than a note, the method 400 advances (or reverses) playback of the recording of the web conference to the time where the note associated with the bookmark was entered. The method 400 also displays the content of the note.

The method 400 proceeds to step 412, where the method 400 processes a user input on a note. If the user input indicates that the user wishes to edit the note, the method 400 proceeds to step 414. At step 414, the method 400 receives modifications to the content of the note. The method 400 records the timestamp marking the time of the edit along with the edited content and stores the edited noted.

If the user input identifies that the user wishes to share the note, the method 400 proceeds to step 416. At step 416, the method 400 receives a user identifier of a user with whom the note is to be shared. The method 400 uses the user identifier to retrieve information about the user, such as an email address and display name for the user. The method 400 also receives a role for the user. The role is assigned by the original author of the note. The user may assign the role of either author or viewer. The role of author allows the user to edit the shared note. The role of viewer allows the user to view the shared note. The method 400 stores the user information for the user with whom the note is being shared, the role of the user, a timestamp of the time when the note was shared, and an update to the permissions to "Shared".

If the user input identifies that the user wishes to merge a first note with a second note of another user, the method 400 proceeds to step 418. At step 418, the method 400 receives the two notes that are to be merged. The method 400 generates a new merged note. The method 400 combines the content of the first note and the second note. The method 400 identifies a timestamp of the first note and a timestamp of the second note. The method 400 uses the earlier of the timestamps as the timestamp of the merged note. The user information for both users is stored with the roles of the users set as author. The method 400 stores the new merged note with the identified information.

If the user input identifies that the user wishes to print the notes, the method 400 proceeds to step 420. At step 420, the method 400 receives a selection of whether the user wishes to print only private notes, only public notes, or all notes. The method 400 combines all selected notes and provides the document to the user for editing. The user may then edit or format the document to the needs of the user, who may then print the document.

The method 400 proceeds to step 422, where the method 400 ends.

Figure 5:
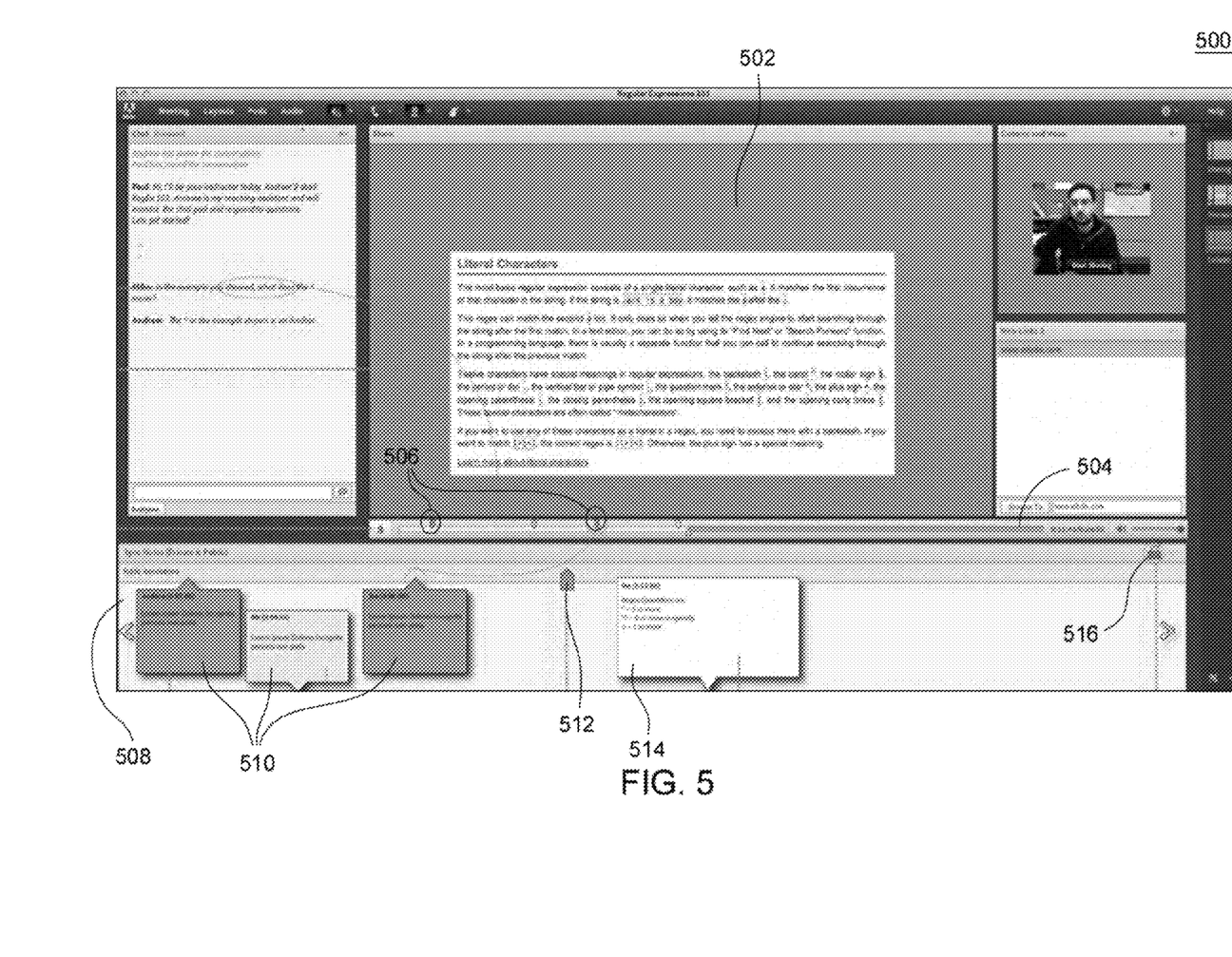
FIG. 5 illustrates a screen shot of a playback of a recording of a web conference configured in accordance with an embodiment of the present invention.

FIG. 5 illustrates a screen shot 500 of a playback of a recording of a web conference configured in accordance with an embodiment of the present invention. The playback of the recording includes content 502 of the web conference. In addition, the playback includes a timeline 504. The timeline includes bookmarks 508 located at times along the timeline associated with timestamps of the notes. The recording includes a note pane 508 where notes 510 are displayed. Public notes are distinguished from private note using color coding. Notes can be collapse in order to remove clutter. Collapsed note 512 may be selected at which time the note is expanded. Selected note 514 may be edited, shared, or merged with another note in the note pane 508. A print icon 516 may be selected to print one or more notes.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   automatically detecting, by one or more processors, an action performed by a first user during a web conference, wherein the action is at least one of joining the web conference, asking a verbal question, responding to a poll, or exiting the web conference;
   in response to detecting the first user's action and without an indication that the first user has selected to enter a note:
      automatically generating, by the one or more processors, a note that identifies the first user's action as at least one of joining the web conference, asking the verbal question, responding to the poll, or exiting the web conference;
      automatically generating, by the one or more processors, timestamp metadata that identifies a timestamp representing when the first user performed the action during the web conference; action metadata that identifies the first user's action as at least one of joining the web conference, asking the verbal question, responding to the poll, or exiting the web conference; a meeting identifier that identifies the web conference with which the note is associated; and a first user identifier that identifies the first user who performed the action;
   storing, by the one or more processors, the note, the timestamp metadata, the action metadata, and the meeting identifier with a recording of the web conference; and displaying, by the one or more processors, the note on a timeline during playback of the recording at a location on the timeline that corresponds to the timestamp.

2. The method of claim 1, further comprising:
displaying a bookmark representing the note on the timeline, the bookmark containing a hyperlink corresponding to the timestamp; and
upon receiving a selection of the hyperlinked bookmark from a client device, playing back the recording starting from the timestamp corresponding to the hyperlinked bookmark.

3. The method of claim 1, further comprising:
receiving, from a client device, a selection from the first user to display the note exclusively to the first user during playback of the web conference; and
displaying the note exclusively to the first user during playback of the web conference.

4. The method of claim 1, wherein automatically detecting the action performed by the first user during the web conference comprises receiving an indication of the action performed from a client device.

5. The method of claim 1, further comprising:
receiving, by the one or more processors, a content note containing content entered by the first user through a companion note-taking application stored on a mobile device;
sharing, by the one or more processors, the content note with a second user, wherein sharing comprises:
receiving, by the one or more processors, a second user identifier for the second user;
receiving, by the one or more processors, identification of a role for the second user, wherein the role is one of an author or a viewer;
updating, by the one or more processors, permissions on the content note to identify the content note as shared; and
storing, by the one or more processors, the shared content note to include the received second user identifier, the role of the second user, and the updated permissions.

6. The method of claim 1, further comprising:
receiving, by the one or more processors, a first content note containing content entered by the first user and a second content note containing content entered by a second user;
merging, by the one or more processors, the first content note and the second content note, wherein merging comprises:
combining, by the one or more processors, at least a portion of the content of the first content note and at least a portion of the content of the second content note into a merged content note;
identifying, by the one or more processors, an earlier timestamp from the timestamp of each of the first and second content notes;
identifying, by the one or more processors, a role for each of the first and second users as authors of the merged content note;
updating, by the one or more processors, permissions on the merged content note to a merged status; and
storing, by the one or more processors, the merged content note to include the identified timestamp, the identified roles, and the updated permissions.

7. The method of claim 1, further comprising:
receiving, by the one or more processors, a first private note containing content entered by the first user;
receiving, by the one or more processors, a second private note containing content entered by a second user;
receiving, by the one or more processors, a public note containing content entered by the second user;
storing, by the one or more processors, the first private note, the second private note, and the public note;
displaying, by the one or more processors, during playback to the first user the first private note and the public note; and
displaying, by the one or more processors, during playback to the second user the second private note and the public note.

8. A system for timeline-synchronized note taking during a web conferences comprising:
at least one processor;
at least one non-transitory computer readable storage medium storing instructions that, when executed by the at least one processor, cause the system to:
automatically detect an action performed by a first user during a web conference, wherein the action is at least one of joining the web conference, asking a verbal question, responding to a poll, or exiting the web conference;
in response to detecting the first user's action and without an indication that the first user has selected to enter a note:
automatically generate a note that identifies the first user's action as at least one of joining the web conference, asking the verbal question, responding to the poll, or exiting the web conference;
automatically generate timestamp metadata that identifies a timestamp representing when the first user performed the action during the web conference; action metadata that identifies the first user's action as at least one of joining the web conference, asking the verbal question, responding to the poll, or exiting the web conference; a meeting identifier that identifies the web conference with which the note is associated; and a first user identifier that identifies the first user who performed the action;
store the note, the timestamp metadata, the action metadata, and the meeting identifier with a recording of the web conference; and
display the note on a timeline during playback of the recording at a location on the timeline that corresponds to the timestamp.

9. The system of claim 8, further comprising instructions that, when executed by the at least one processor, cause the system to:
receive a first private note containing content entered by the first user;
receive a second private note containing content entered by a second user;
receive a public note containing content entered by the second user;
store the first private note, the second private note, and the public note;
display during playback to the first user the first private note and the public note; and
display during playback to the second user the second private note and the public note.

10. The system of claim 8, wherein the instructions that, when executed by the at least one processor, cause the system to automatically detect the action performed by the first user during the web conference further cause the system to receive an indication of the action performed from a client device.

11. The system of claim 8, further comprising instructions that, when executed by the at least one processor, cause the system to:
  receive a content note containing content entered by the first user through a companion note-taking application stored on a mobile device;
  share the content note with a second user by performing steps comprising:
    receiving a second user identifier for the second user;
    receiving identification of a role for the second user, wherein the role is one of an author or a viewer;
    updating permissions on the content note to identify the content note as shared; and
    storing the shared content note to include the received second user identifier, the role of the second user, and the updated permissions.

12. The system of claim 8, further comprising instructions that, when executed by the at least one processor, cause the system to:
  receive a first content note containing content entered by the first user and a second content note containing content entered by a second user;
  merge the first content note and the second content note by performing steps comprising:
    combining at least a portion of the content of the first content note and at least a portion of the content of the second content note into a merged content note;
    identifying an earlier timestamp from the timestamp of each of the first content note and the second content note;
    identifying a role for each of the first and second users as authors of the merged content note;
    updating permissions on the merged content note to a merged status; and
    storing the merged content note to include the identified timestamp, the identified roles, and the updated permissions.

13. The system of claim 8, further comprising instructions that, when executed by the at least one processor, cause the system to:
  display a bookmark representing the note on the timeline, the bookmark containing a hyperlink corresponding to the timestamp; and
  upon receiving a selection of the hyperlinked bookmark from a client device, playback the recording starting from the timestamp corresponding to the hyperlinked bookmark.

14. A non-transitory computer readable medium storing instructions thereon that, when executed by at least one processor, cause a computing device to:
  automatically detect an action performed by a first user during a web conference, wherein the action is at least one of joining the web conference, asking a verbal question, responding to a poll, or exiting the web conference;
  in response to detecting the first user's action and without an indication that the first user has selected to enter a note:
    automatically generate a note that identifies the first user's action as at least one of joining the web conference, asking the verbal question, responding to the poll, or exiting the web conference;
    automatically generate timestamp metadata that identifies a timestamp representing when the first user performed the action during the web conference; action metadata that identifies the first user's action as at least one of joining the web conference, asking a verbal question, responding to a poll, or exiting the web conference; a meeting identifier that identifies the web conference with which the note is associated; and a first user identifier that identifies the first user who performed the action;
  store the note, the timestamp metadata, the action metadata, and the meeting identifier with a recording of the web conference; and
  display the note on a timeline during playback of the recording at a location on the timeline that corresponds to the timestamp.

15. The non-transitory computer readable medium of claim 14, further comprising instructions that, when executed by the at least one processor, cause the computing device to:
  receive a first private note containing content entered by the first user;
  receive a second private note containing content entered by a second user;
  receive a public note containing content entered by the second user;
  store the first private note, the second private note, and the public note;
  display during playback to the first user the first private note and the public note; and
  display during playback to the second user the second private note and the public note.

16. The non-transitory computer readable medium of claim 14, further comprising instructions that, when executed by the at least one processor, cause the computing device to:
  receive from a client device a selection from the first user to display the note exclusively to the first user during playback of the web conference; and
  display the note exclusively to the first user during playback of the web conference.

17. The non-transitory computer readable medium of claim 14, wherein the instructions that, when executed by the at least one processor, cause the computing device to automatically detect the action performed by the first user during the web conference further cause the computing device to receive an indication of the action performed from a client device.

18. The non-transitory computer readable medium of claim 14, further comprising instructions that, when executed by the at least one processor, cause the computing device to:
  receive a content note containing content entered by the first user through a companion note-taking application stored on a mobile device;
  share the content note with a second user by performing steps comprising:
    receiving a second user identifier for the second user;
    receiving identification of a role for the second user, wherein the role is one of an author or a viewer;
    updating permissions on the content note to identify the content note as shared; and
    storing the shared content note to include the received second user identifier, the role of the second user, and the updated permissions.

19. The non-transitory computer readable medium of claim 14, further comprising instructions that, when executed by the at least one processor, cause the computing device to:
  receive a first content note containing content entered by the first user and a second content note containing content entered by a second user;

merge the first content note and the second content note by performing steps comprising:
combining at least a portion of the content of the first content note and at least a portion of the content of the second content note into a merged content note;
identifying an earlier timestamp from the timestamp of each of the first content note and the second content note;
identifying a role for each of the first and second users as authors of the merged content note;
updating permissions on the merged content note to a merged status; and
storing the merged content note to include the identified timestamp, the identified roles, and the updated permissions.

20. The non-transitory computer readable medium of claim 14, further comprising instructions that, when executed by the at least one processor, cause the computing device to:
display an icon representing the note on the timeline as a bookmark containing a hyperlink corresponding to the timestamp; and
upon receiving a selection of the hyperlinked bookmark from a client device, playback the recording starting from the timestamp corresponding to the hyperlinked bookmark.

* * * * *